US008836158B2

(12) United States Patent
Cho et al.

(10) Patent No.: US 8,836,158 B2
(45) Date of Patent: Sep. 16, 2014

(54) HORIZONTAL AXIS WIND TURBINE SYSTEMS AND METHODS

(76) Inventors: Hanwoo Cho, Okemos, MI (US); Whang Cho, Seoul (KR)

(*) Notice: Subject to any disclaimer, the term of this patent is extended or adjusted under 35 U.S.C. 154(b) by 61 days.

(21) Appl. No.: 13/480,930

(22) Filed: May 25, 2012

(65) Prior Publication Data

US 2013/0277971 A1    Oct. 24, 2013

(30) Foreign Application Priority Data

Apr. 23, 2012 (KR) .......................... 10-2012-0042133

(51) Int. Cl.
 *F03D 7/00* (2006.01)

(52) U.S. Cl.
 USPC .......................................................... 290/55

(58) Field of Classification Search
 USPC ...................................... 290/44, 55
 See application file for complete search history.

(56) References Cited

U.S. PATENT DOCUMENTS

| 2,539,862 | A | * | 1/1951 | Rushing | 62/230 |
| 3,942,026 | A | * | 3/1976 | Carter | 290/55 |
| 4,068,131 | A | * | 1/1978 | Jacobs et al. | 290/55 |
| 4,291,233 | A | | 9/1981 | Kirschbaum | |
| 4,311,435 | A | * | 1/1982 | Bergero | 416/170 R |
| 5,222,924 | A | | 6/1993 | Shin et al. | |
| 5,876,181 | A | | 3/1999 | Shin | |
| 6,923,615 | B2 | * | 8/2005 | Crinion | 415/4.1 |
| 6,981,839 | B2 | * | 1/2006 | Fan | 415/4.1 |
| 7,215,037 | B2 | * | 5/2007 | Scalzi | 290/55 |
| 2004/0096327 | A1 | * | 5/2004 | Appa et al. | 416/1 |
| 2005/0280264 | A1 | * | 12/2005 | Nagy | 290/55 |
| 2006/0151664 | A1 | * | 7/2006 | Yu et al. | 244/4 R |
| 2012/0274075 | A1 | * | 11/2012 | Kroger | 290/55 |
| 2012/0286519 | A1 | * | 11/2012 | Yoon | 290/55 |

FOREIGN PATENT DOCUMENTS

| DE | 3631709 | A | * | 3/1988 |
| GB | 1556126 | A | * | 11/1979 |
| JP | 09-004558 | A | | 1/1997 |
| JP | 2001186740 | A | * | 7/2001 |
| JP | 2013060942 | A | * | 4/2013 |

(Continued)

OTHER PUBLICATIONS

Kooksun Lee et al., MPPT and Yawing Control of a New Horizontal-Axis Wind Turbine with Two Parallel-Connected Generators, 8th International Conference on Power Electronics—ECCE Asia, May 30-Jun. 3, 2011, Jeju, South Korea—7 pages.

(Continued)

*Primary Examiner* — Joseph Waks
(74) *Attorney, Agent, or Firm* — Maier & Maier, PLLC

(57) ABSTRACT

A system for operating a horizontal axis wind turbine includes a turbine rotor and a rotor blade adapted to rotate about a horizontal axis, two vertical shafts, a plurality of gears adapted to translate a rotational motion of the turbine rotor into counter-rotating vertical rotational motions of the shafts, and two generators fixed to a tower, adapted to translate a rotational motion of the shafts into electrical power. A method of operating a horizontal axis wind turbine system includes obtaining a turbine rotor and a rotor blade adapted to rotate about a horizontal axis, obtaining two vertical shafts, obtaining a plurality of gears, and obtaining two generators fixed to a tower, translating a rotational motion of the turbine rotor into counter-rotating vertical rotational motions of the shafts using the gears, and translating a rotational motion of the shafts into electrical power using the generators.

26 Claims, 12 Drawing Sheets

(56) References Cited

FOREIGN PATENT DOCUMENTS

| KR | 10-0880241 | * | 1/2009 |
| KR | 10-0880241 B1 | | 1/2009 |
| KR | 962241 B1 | * | 6/2010 |

OTHER PUBLICATIONS

International Search Report dated Jan. 22, 2013, as issued in corresponding International Patent Application No. PCT/KR2012/004266, filed May 30, 2012; 3 pgs.

* cited by examiner

HORIZONTAL AXIS WIND TURBINE SYSTEMS AND METHODS

RELATED APPLICATIONS

This application claims priority, under 35 U.S.C. §119, to South Korean Patent Application No. 10-2012-0042133, filed on Apr. 23, 2012, the disclosure of which is incorporated by reference herein in its entirety.

BACKGROUND

Conventional horizontal axis wind turbine (HAWT) systems consist basically of rotor blades, a turbine rotor shaft, a nacelle containing a single generator to which the turbine rotor is connected directly or indirectly using speed changing gear boxes and cooling system, and a tower supporting the nacelle. This conventional HAWT system architecture is subject to three major constraints.

A first major constraint of conventional HAWT systems is the requirement to constantly keep track of the delivery of electrical power generated from the generator to the ground. Specifically, the nacelle comprising a generator should rotate, or yaw, continuously to follow an unpredictably varying wind direction. This is conventionally accomplished either by using passive yawing mechanisms, such as the tail vane in small size HWAT systems, or by activating a motorized yawing mechanism, as in medium and large scale systems.

In small sized HAWT systems, the electrical power generated from the generator contained in the nacelle is conventionally transmitted by using slip-ring and brush mechanisms. Despite electrical energy loss and maintenance problems, this mechanism may be a practical as well as an economical method for small HAWT systems, because the amount of transmitted current is generally rather small, in the order of a few tens of amperes. However, in larger HAWT systems, such as those generating megawatts of power, the current required to be transmitted may be in the order of thousands of amperes. In these large HAWT systems, the brush mechanism may not be a viable method, because of the large amount of expected energy loss caused by unstable contact resistance between the brush and the slip-ring.

The method conventionally employed in large HAWT systems for the same purpose involves a direct connection by electric cable from the generator to the ground, with enough slack to allow the nacelle to turn through predetermined angles in two directions. When it is detected that the predefined angle limit is reached, by closely monitoring the amount of cumulative angle the nacelle yaws in either direction, the system is shut down and moved into unwinding mode.

To address the electrical energy transmission problem of HAWT systems, vertical axis wind turbine (VAWT) systems, offering an alternative wind turbine architecture, are conventionally used. In a VAWT system, the generator is fixed to the ground, thereby eliminating the energy transmission problem. However, a main drawback of VAWT systems comes from the fact that their efficiency is generally lower than those of comparable HAWT systems. Furthermore, large-capacity VAWT systems are often difficult to build.

A second major constraint of conventional HAWT systems comes from the structure in which the nacelle carries almost every apparatus necessary for power generation, including rotor blades, generators, gearboxes, cooling systems, and inverter-converter systems. Due to space restrictions in conventional architectures, it is generally difficult to attempt more efficient and economic layouts of apparatuses. For example, a structure implementing a single large-size generator and gearbox typically requires a large cooling system, because the heat density, i.e., heat generated per unit space, is generally too high for natural cooling, due to the highly congested layout of system components within a restricted space.

Further, a maintenance problem may remain. When a large and heavy component, such as a generator, needs to be replaced, conventional HAWT systems typically require a large, costly tower crane to be called to the site of installation.

A third major constraint of conventional HAWT systems relates to size expansion limits when attempting to increase the power generated by a single installation site, not only from a design viewpoint but also from an economic viewpoint. As the size of the moving part, especially the rotor blades, increases in length to sweep larger area, the swept area and the cross sectional area of the blade increase as a square of the length, while the mass of the blade increases as a cube of the length. Thus, the mass of the blade increases faster than the swept area, and the energy produced per unit mass of moving part decreases. Thus, conventional large-scale HAWT systems are often criticized, in favor of small sized systems. Eventually, apart from the increased costs, conventional large-scale HAWT systems present mechanical design and construction problems, as well as the logistical problem of transporting large-sized objects from a factory to a construction site.

Basic structures using bevel gear system are described in "Wind turbine-generator," U.S. Pat. No. 4,291,233, filed Jan. 29, 1980 (Reference [1]), "Multi-unit rotor blade system integrated wind turbine," U.S. Pat. No. 5,876,181, filed Jun. 23, 1995 (Reference [2]), and "Over-drive gear device," U.S. Pat. No. 5,222,924, filed Sep. 8, 1992 (Reference [3]); References [1], [2] and [3] are herein incorporated by reference. In Reference [1], by employing gearing of three bevel gears, the horizontal rotation of a turbine rotor may be translated into two vertically counter-rotating motions, which may be delivered respectively to the rotor and field parts of a single generator, thereby accomplishing increased relative rotation speed between the stator and the field parts of the generator. In this case, however, the use of slip-ring and brush mechanism may be inevitable and it may be impossible to realize dualization.

In Reference [2] a bevel gear system is proposed, which may allow for the collection of more wind energy from multiple wind turbine rotors installed at multiple positions on a single tower, while in Reference [3], the planetary gear may be used to increase the rotational speed applied to the axis of a generator. In both cases, the destination of the collected wind energy may be the single generator fixed to the tower, which may be very favorable from the view point of energy transmission. But there may be a drawback in this embodiment. When the collected wind energy is fed into the shaft of the single generator fixed to the tower, the reaction torque counteracting the generating torque, equal in magnitude but opposite in direction, may be applied to the nacelle. This implies that without any breaking system or active yaw control system, the nacelle may no longer be able to face the wind. In other words, the proposed system may operate in such a way that a torque harvested from the wind is applied to the generator, while the same amount of torque should be applied to the nacelle inevitably to prevent the nacelle from yawing away from wind. Hence, this system may make it not only impossible to build a free yawing HAWT system, but also impractical to build HAWT system even with a motorized yawing control system, due to the unnecessarily severe burden passed to the yawing control system in maintaining yaw direction of nacelle, which may result in wasting valuable energy and internally building up superfluous mechanical stress as well.

When attempting to convert horizontal rotation to vertical rotation through bevel gearing, it may be impossible by using a single generator rigidly fixed to the tower to eliminate the yawing torque applied to the nacelle created in reaction to the torque the induced at generator.

SUMMARY

An exemplary embodiment of a horizontal axis wind turbine system may include at least one turbine rotor adapted to rotate about a horizontal axis or a tilted axis, at least one rotor blade coupled to the turbine rotor, at least two vertical shafts adapted to rotate about vertical axes, a plurality of gears adapted to translate a rotational motion of the turbine rotor into counter-rotating vertical rotational motions of the vertical shafts, and at least two generators fixed to a tower or the ground, each adapted to translate a vertical rotational motion of one of the vertical shafts into electrical power.

An exemplary method of operating a horizontal axis wind turbine system may include obtaining at least one turbine rotor adapted to rotate about a horizontal axis or a tilted axis, obtaining at least one rotor blade coupled to the turbine rotor, obtaining at least two vertical shafts adapted to rotate about vertical axes, obtaining a plurality of gears, and obtaining at least two generators fixed to a tower or the ground, translating a rotational motion of the turbine rotor into counter-rotating vertical rotational motions of the vertical shafts using the gears, and translating a vertical rotational motion of one of the vertical shafts into electrical power using the generators.

BRIEF DESCRIPTION OF THE DRAWINGS

The present embodiments are illustrated by way of example and not limitation in the figures of the accompanying drawings, in which like references indicate similar elements.

DETAILED DESCRIPTION

Figure 1:
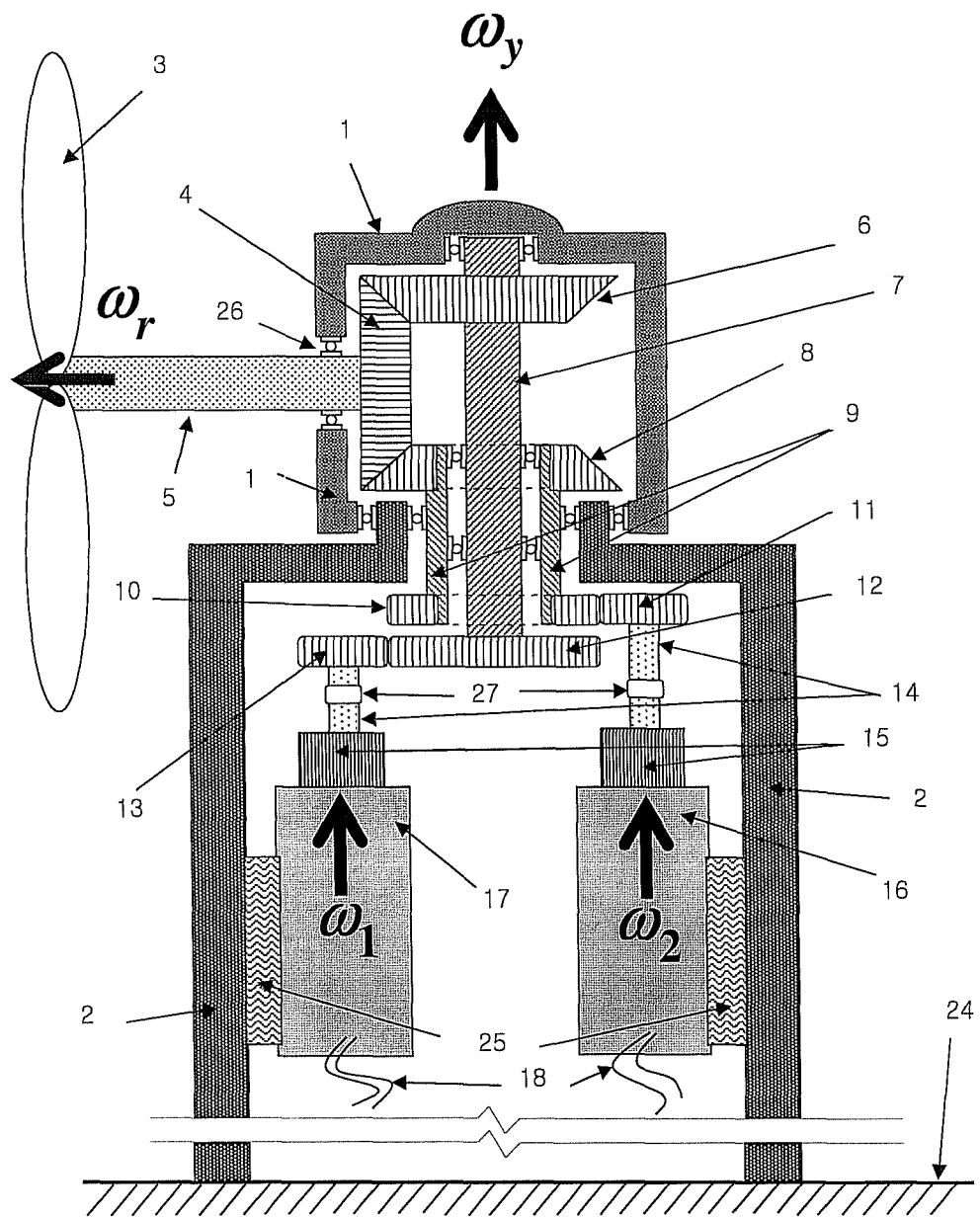
FIG. 1 illustrates an exemplary embodiment of a horizontal axis wind turbine system.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

In an exemplary embodiment of a horizontal axis wind turbine (HAWT) system, a generator and related apparatuses may be contained outside a nacelle. A nacelle may contain a bevel gear mechanism, which may include bevel gears, hypoid gears, and/or any other gears known in the art. Alternatively, a nacelle may further contain a blade pitch control mechanism, especially if part of a large-scale HAWT system. The horizontal rotational motion about a rotor axis may be redirected to two counter rotating vertical rotors, through, for example, three or four bevel gears pairing inside the nacelle, one or two bevel gears rotating horizontally with the rotor, and two rotors rotating vertically by gearing with the horizontally rotating bevel gear, including at least one on top, and at least one on the bottom. Alternatively, any number of bevel gears may be used. Two vertically rotating bevel gears may generate rotational motions opposite in direction to each other, and these vertical rotational motions may be coaxially derived, and independently and respectively fed into two or more generators fixed rigidly on the tower or on the ground. This architecture may require neither a slip ring and brush system nor a slack monitoring system in order to transmit the generated power to the ground. Further, the mechanical power transmission path from the turbine rotor to the generators may be divided into two, which may reduce the drive train capacity of each path by half in comparison to conventional structures.

Another exemplary embodiment of a horizontal axis wind turbine system may include two counter rotating turbine rotors. Such embodiment may include a simple addition of bevel gear aligned along the same horizontal axis of rotation as the previously described horizontal bevel gear, but disposed opposite to it. Another wind turbine rotor with blades may be readily connected to the system through this extra horizontal bevel gear and additional wind energy may be harvested.

A cooling problem related to space restriction may be solved by utilizing a large space which is readily available inside the tower. In current HAWT systems, the tower is an empty hollow tube structure whose single role is to support the load transmitted through a nacelle. If a generator and a gearbox are shifted down and installed inside a tower, the accrued flexibility in laying out generating system components may be enormous. Alternatively, multiple number of small capacity generators may be installed instead of a single generator, covering as much space as it is available inside the tower, which may result in a reduction in the heat generation per unit space, thereby making it easy to yield a natural cooling system with proper ventilation.

Using tower space as much as possible may also solve a maintenance problem. If the size of the system components is reduced, if their number is increased, and if they are located inside the tower, a simple motorized crane system permanently installed inside the tower may suffice for many or all maintenance purposes related to these components.

Problems associated with expanding conventional HAWT system installation sites may be overcome by using dualization, namely using two, or more, HAWT systems on a single tower at one site. For example, a HAWT system may include two counter rotating blades, two generators, and two inverter-converter systems. The counter rotating blades may be of similar size, the generators may produce similar generating power, and the inverter-converter systems may be similar and may have comparable capacity. A counter rotating two rotor blade system may increase the production power by about 30-50 percent, in comparison to a single blade system, especially for systems involving lower rotor speeds, as commonly found in large scale HAWT systems.

Producing more energy per site may help in various applications, including, for example, offshore construction of HAWT systems, in which the cost of all mechanically moving parts, including blades and speed changing gear boxes, and all electrical components, such as generators and inverter-converter systems, may be less than 40 percent of the total cost required in constructing a typical offshore HAWT system.

Referring generally to exemplary embodiments shown in FIGS. 1-12, embodiments disclosed herein describe horizontal axis wind turbine systems in which any relative rotations between two adjacent mechanical bodies may be supported by the bearings (26). Further, although some elements of exemplary embodiments are described as horizontal or vertical, or substantially horizontal or substantially vertical, it is understood that these elements may alternatively be tilted at any angle, as desired, and may not be actually horizontal or vertical.

Furthermore, many embodiments are described in terms of sequences of actions to be performed by, for example, elements of control systems, supervising systems, digital control systems or digital signal processing (DSP) devices. It will be recognized that various actions described herein can be performed by specific circuits (e.g., application specific integrated circuits (ASICs)), by program instructions being executed by one or more processors, or by a combination of both. Additionally, these sequences of actions and processes described herein can be considered to be embodied entirely within any form of computer platform having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

FIG. 1 shows an exemplary embodiment of a horizontal axis wind turbine system, which may include at least one of a nacelle (1), a tower (2), rotor blades (3), bevel gears (4), (6) and (8), a turbine rotor shaft (5), shafts (7), (9) and (14), gears (10), (11), (12) and (13), gear boxes (15), generators (16) and (17), and electric cables (18). A single turbine rotor shaft (5) may be mechanically connected to two generators (16) and (17) fixed at a tower (2), which may be fixed to the ground (24). In FIG. 1, the rotational motions of the turbine rotor shaft (5), the nacelle (1), and two generators (16) and (17) may be indicated by arrows pointing in the direction of the axes of rotation.

Another exemplary embodiment of a horizontal axis wind turbine system may include at least one turbine rotor adapted to rotate about a horizontal axis, at least two vertical shafts, each adapted to rotate about one of one or a plurality of vertical axes, and a plurality of gears adapted to translate a horizontal rotational motion of the at least one turbine rotor into counter-rotating vertical rotational motions of the vertical shafts, and at least two generators fixed to at least a tower or the ground, each adapted to translate a vertical rotational motion of one of the at least two vertical shafts into electrical power. The counter-rotating vertical motions of the vertical shafts may be delivered to the generators independently and respectively.

Another exemplary embodiment of a horizontal axis wind turbine system may include two groups of generators. Each group of generators may include a plurality of generators and a clutch mechanism. The plurality of generators may be mechanically connected using the clutch mechanism, and configured in at least one of parallel and series, and the clutch mechanism may be adapted to synchronize rotational motions of at least two of the plurality of generators.

Figure 2:
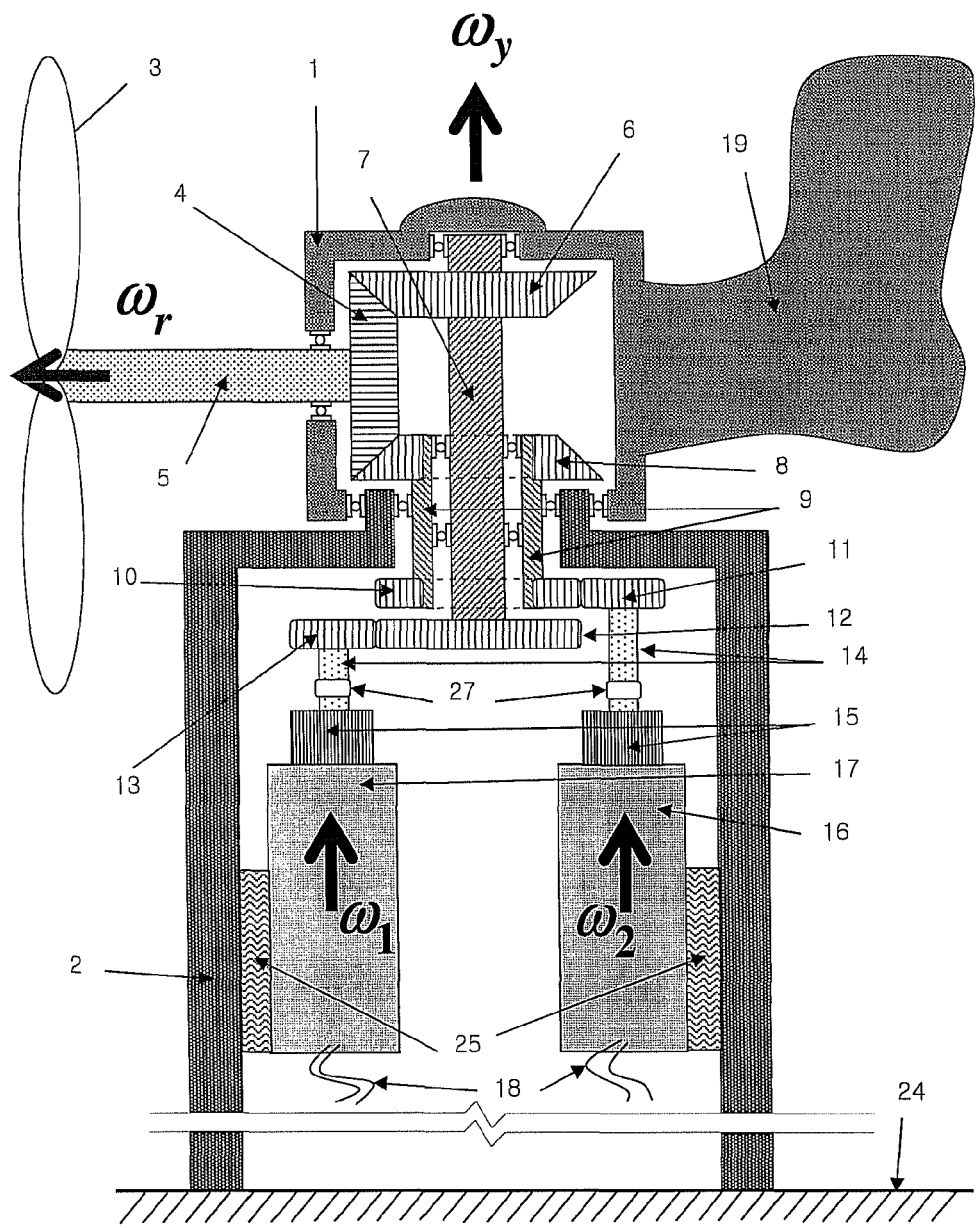
FIG. 2 illustrates an exemplary embodiment of a horizontal axis wind turbine system with a tail vane.

FIG. 2 shows an exemplary embodiment of a horizontal axis wind turbine system. Many components of this exemplary embodiment are the same or similar to those of the exemplary embodiment illustrated in FIG. 1, and are identified by similar numerals. Such components should be understood to have substantially similar characteristics and functionality in both exemplary embodiments. This embodiment may further include a tail vane (19) coupled to the nacelle. The tail vane (19) may make the system yaw passively using wind.

To simplify an analysis of the motion of an exemplary embodiment of a horizontal axis wind turbine system, one may assume first that the nacelle (1) is not yawing. In this case, the rotational motion of blades (3) relative to the nacelle (1) may be transmitted to the horizontally installed bevel gear (4) through the rotor shaft (5). The rotational motion transmitted to a bevel gear (4) may in turn induce rotational motions of two vertically installed bevel gears, the one (6) on the top and the other (8) at the bottom, in which the directions of rotational motions of two vertically installed bevel gears (6) and (8) may be opposite to each other, i.e., the two bevel gears may be counter-rotating.

One may then assume that there exists yawing motion of nacelle (1), but without any rotation of rotor blades (3) and the rotor shaft (5) relative to the nacelle (1). In this case, two vertically arranged bevel gears (6) and (8) may rotate with the nacelle (1) with the same yawing speed the nacelle (1) is experiencing. In other words, in this case, the two vertically installed bevel gears (6) and (8) may have the same rotational velocity as the nacelle (1) without any relative rotational motion incurred between them.

Finally, one may assume that the rotational motion of rotor blade (3) relative to the nacelle (1) and the yawing motion of the nacelle (1) are caused simultaneously. In this case, the two vertically installed bevel gears (6) and (8) may create rotational motions created by the superposition of rotational motions of the blades (3) and the nacelle (1). The rotational motions of the two vertically installed bevel gears (6) and (8) may be transmitted through two coaxially arranged shafts (7) and (9) to the two generators (16) and (17) independently and respectively, which may be rigidly coupled to the tower (2) using proper fixing device (25) or installed on the ground (24) by properly extending the shafts required to transfer rotational motion. The generators (16) and (17) may be coupled to the tower (2) using bolting, welding, brackets, adhesives, magnets and/or any other attachment method known in the art. In other words, the rotation of bevel gear (6) may be transferred to the generator (17) sequentially through the vertical shaft (7), the gear (12) and (13), the shaft (14), and speed changing gear box (15). On the other hand, the rotation of bevel gear (8) may be delivered to the generator (16) sequentially through the vertical hollow shaft (9), the gear (10) and (11), the shaft (14), and then to speed changing gear box (15). The electrical power generated by the generators may be readily transmitted through electric cables (18). Since the mechanical power may be transmitted from the rotor to two generators through two independent paths, it may be possible to reduce the drive train capacity of each path by half in comparison to conventional structures.

To be able to understand the behavior of the mechanism quantitatively, the kinematic relationship governing the operations of the proposed system may be derived, to simplify the explanation, by assuming that two generators are configured symmetrically in a mechanical point of view, as in $$\omega_1 = a\cdot\omega_r - b\cdot\omega_y$$

$$\omega_2 = -a\cdot\omega_r - b\cdot\omega_y \qquad <1>$$

where $\omega_r$ and $\omega_y$ may refer to the rotational speed of the rotor shaft (5) relative to the nacelle (1) and the yawing speed of the nacelle (1), respectively, while $\omega_1$ and $\omega_2$ may represent respectively the rotational speed of the generator (17) and (16), and a and b may be two positive constants determined by the gear ratio involved in motion transmission path. The symmetric configuration may not require two generators to have electrically similar characteristics. If the assumption that the two generators are configured symmetrically is not met, then there may be in general four proportional constants involved in Equation <1>, determined by the gear ratio involved in motion transmission path. The sign convention indicating the positive direction of rotational velocity denoted here by the arrow signs may follow the right hand rule, i.e. when the four right hand fingers except thumb curl around arrow shaft, the thumb may indicate the positive direction of rotation coinciding with the arrow head. In deriving the Equation <1>, it is assumed that the speed changing gear boxes (15) do not change the direction of rotation. In view of Equation <1>, it may be found that the rotational speeds of the generators (16) and (17) may be proportional to the rotational speed of rotor shaft (5) but with opposite signs, while being proportional to the yawing speed with the same signs. For the later reference, the inverse relationship of Equation <1> may be obtained as in $$\omega_r = \frac{\omega_1}{2a} - \frac{\omega_2}{2a} \qquad <2>$$

$$\omega_y = -\left(\frac{\omega_1}{2b} + \frac{\omega_2}{2b}\right)$$

The dual relationship to Equation <1> may be derived by assuming no loss of power along power transmission path as in $$\tau_r = a\tau_1 - a\tau_2$$

$$\tau_y = -(b\tau_1 + b\tau_2) \qquad <3>$$

and its inverse relationship as in $$\tau_1 = \frac{\tau_r}{2a} - \frac{\tau_y}{2b} \qquad <4>$$

$$\tau_2 = -\left(\frac{\tau_r}{2a} + \frac{\tau_y}{2b}\right)$$

where $\tau_r$ and $\tau_y$ may refer to the torque transmitted through the rotor shaft (5) and the yawing torque developed on the nacelle body (1), respectively, and $\tau_1$ and $\tau_2$ may represent respectively the torques applied to shafts of the generator (17) and (16). The sign convention for the torques may follow the same rule for the angular velocities defined previously.

An exemplary embodiment of a horizontal axis wind turbine system may involve passive (or free) yawing control. It may be assumed that some exogenously created yawing torque $\tau_y$ is applied to the nacelle (1) when the two generators with similar electromechanical characteristics are operated in normal generating mode turning at equal speed $\omega_0$ in magnitude and maintaining the balance between the torques induced at two generators, which may be essentially determined by the amount of current produced at each generator, such that $$\tau_1 = -\tau_2 = \frac{\tau_r}{2a}, \qquad <5>$$

by solely using the torque $\tau_r$ supplied by the rotor shaft (5). Then, as may be seen from Equation <4>, the torque applied to one generator may become larger in magnitude than the torque applied to the other generator, which may naturally change the speed of each generator by a similar amount $\Delta\omega$ as in $$\omega_1^* = \omega_0 + \Delta\omega$$

$$\omega_2^* = -\omega_0 + \Delta\omega \qquad <6>$$

In view of Equations <2> and <6>, the yawing motion $\omega_y$ may be ensued without changing rotor speed $\omega_r$ by an amount of $$\omega_y = -\left(\frac{\omega_1}{2b} + \frac{\omega_2}{2b}\right) = -\left(\frac{\Delta\omega}{b}\right) \qquad <7>$$

Using this operation principle, the passive (or free) yawing operation may be easily accomplished both in a upwind type HAWT generator system with tail vane as shown in FIG. 2 and in a downwind type HAWT system, in which aerodynamically generated yawing torque may automatically guide the nacelle to chase the wind direction.

Figure 3:
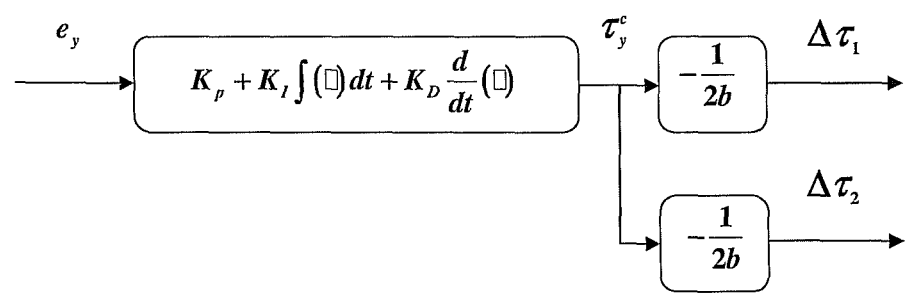
FIG. 3 illustrates an exemplary method of operating a horizontal axis wind turbine system using a simple PID controller for active yawing control by properly distributing rotor torques to two generators.

FIG. 3 shows an exemplary method of operating a horizontal axis wind turbine system using a simple PID controller for active yawing control by properly distributing rotor torques to two generators.

As relating to an exemplary embodiment of a horizontal axis wind turbine system involving active yawing control, as may be observed in Equation <3>, when the torques $\tau_1$ and $\tau_2$ applied to the two generators are kept balanced by controlling generating torques induced at two generators, which may be basically determined by the amount of current produced at each generators, such that $\tau_1 = -\tau_2$,  <8> the yawing torque applied endogenously by the generators to the nacelle (1) may become zero, while the torque $\tau_r$ applied through the rotor shaft (5) by the blades (3) driven by wind may be equally shared in magnitude by two generators as in $$\tau_1 = \frac{\tau_r}{2a} \quad (9)$$

$$\tau_2 = -\left(\frac{\tau_r}{2a}\right)$$

The fact that the yawing torque may be zero may indicate that no angular acceleration of the nacelle (1) is incurred by the torques induced at the generators and consequently the present state of yawing motion of the nacelle (1) may be maintained. If, however, the balance between the induced torques at two generators is broken deliberately, the yawing torque applied to the nacelle (1) may be obtained from the second equation in Equation <3>, which may cause the yawing motion of the nacelle (1). This mechanism of generating yawing motion of the nacelle (1) may be explained as follows.

It may be assumed that the two generators with electromechanically similar characteristics turning at the same speeds $\omega_0$ and $-\omega_0$ while maintaining the balance between the induced torques of two generators are disturbed temporarily by deliberately creating unbalance in induced torques between two generators as in $$\tau_1^* = \frac{\tau_r}{2a} + \Delta\tau_1 \quad (10)$$

$$\tau_2^* = -\left(\frac{\tau_r}{2a}\right) + \Delta\tau_2$$

which may be readily accomplished by producing a discrepancy in magnitude between two currents generated at each generator. In Equation <10>, $\Delta\tau_1$ and $\Delta\tau_2$ denote respectively the perturbed induced torques at two generators. This will make two generators attain new generating speed $\omega_1^*$ and $\omega_2^*$ respectively, which may be expressed at steady state condition as in $$\omega_1^* = \omega_0 + \Delta\omega_1$$

$$\omega_2^* = -\omega_0 + \Delta\omega_2 \quad <11>$$

where $\Delta\omega_1$ and $\Delta\omega_2$ represent amount of speed change of each generator. The consequential changes in the rotational speeds of the rotor shaft (5) and the yawing speed of the nacelle (1) may be estimated from Equation <2> as in $$\omega_r = \frac{\omega_0}{a} + \left(\frac{\Delta\omega_1 - \Delta\omega_2}{2a}\right) \quad (12)$$

$$\omega_y = -\left(\frac{\Delta\omega_1 + \Delta\omega_2}{2b}\right)$$

This result may show that if the induced torques of two generators are controlled such that the condition $\Delta\omega_1 = \Delta\omega_2 = \Delta\omega$ is maintained, the nonzero yawing speed of the nacelle (1) may be created by an amount $$\omega_y = -\left(\frac{\Delta\omega}{b}\right) \quad (13)$$

while the speed of the rotor shaft (5) may be kept undisturbed at $$\omega_r = \frac{\omega_0}{a} \quad (14)$$

Using this principle of controlling two generators, the yawing motion of the nacelle (1) may be controlled effectively without requiring additional active yawing control system. FIG. 3 illustrates the concept of active yawing control using a controller, such as, for example, a simple proportional-integral-derivative (PID) controller, an adaptive controller, an optimal controller, a neuro-fuzzy controller, or any other type of error reducing feedback controller known in the art. $e_y$ denotes yawing error determined by the difference between actual wind direction and current orientation of the nacelle. The required yawing control torque $\tau_y^c$ obtained from the PID controller may be distributed to two generators according to Equation <4>.

Another exemplary method of operating a horizontal axis wind turbine system may include motor control by generators. After a system has been at rest without generating any energy, for lack of availability of wind, or because of maintenance, in order to restart generation it may be desirable to yaw the nacelle so that it faces the wind. This may be done without using extra yawing control systems, by operating two generators in motoring mode. Using the same principle as active yawing control, endogenously generated yawing torques produced by two generators may be applied to the nacelle, for example, temporarily using the energy from a power grid (31).

Another exemplary embodiment of a horizontal axis wind turbine system may include grouping multiple generators. It may be desirable to have flexibility in designing HAWT system. In some cases, multiple generators with small capacity may be used as a group instead of single large one. This structure may be utilized in maximizing the generated power depending on the wind speed. In addition to controlling the amount of generated current from a generator, an active clutch mechanism (27) may be used to selectively disconnect generators, thereby effectively changing the electromechanical impedance reflected at the turbine rotor shaft (5), which may be determined mostly by the total moment of inertia and the friction of a drive train. Lowering the impedance may help the system cut in at lower wind speed. After the system cuts in, more generators may be attached using clutch mechanism to gradually increase the impedance. A method of increasing impedance may be used to raise the cut out wind speed of the system, as the generating capacity of the system may be increased by connecting more generators.

Another advantage of using a multiple generator system is that it may allow to produce a distributed controlled and fault tolerant system structure, at least electrically. Here, since it is possible that each generator may be controlled independently but cooperatively by using supervising system (28), the electrical system failure of some generators may not necessarily lead to overall system shut down. If a failure is detected, a supervising system may change the operation condition accordingly, still maintaining power output balance, for example, at an appropriately lowered level. This architecture may be illustrated in FIG. 11 and FIG. 12.

Figure 11:
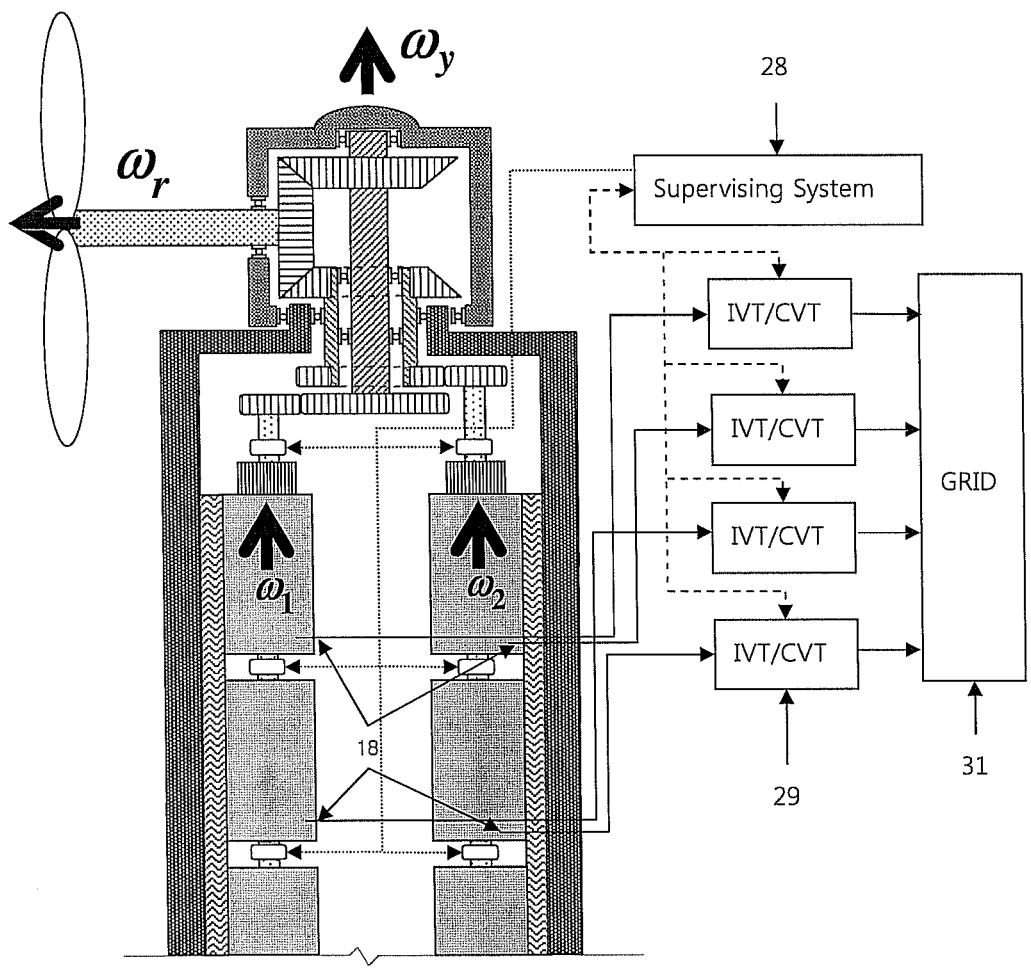
FIG. 11 illustrates an exemplary embodiment of a horizontal axis wind turbine system including a distributed fault tolerant system with an independent ivt/cvt system and an adaptive clutch control system.

FIG. 11 illustrates an exemplary embodiment of a horizontal axis wind turbine system including a distributed fault tolerant system with an independent infinitely variable transmission/continuously variable transmission (ivt/cvt) system and an adaptive clutch control system. Many components of this exemplary embodiment are the same or similar to those of the exemplary embodiment illustrated in FIG. 1. Such components should be understood to have substantially similar characteristics and functionality in both exemplary embodiments. This embodiment may further include a supervising system (28), independent inverter-converters (ivt/cvt) (29) and a power grid (31).

Figure 12:
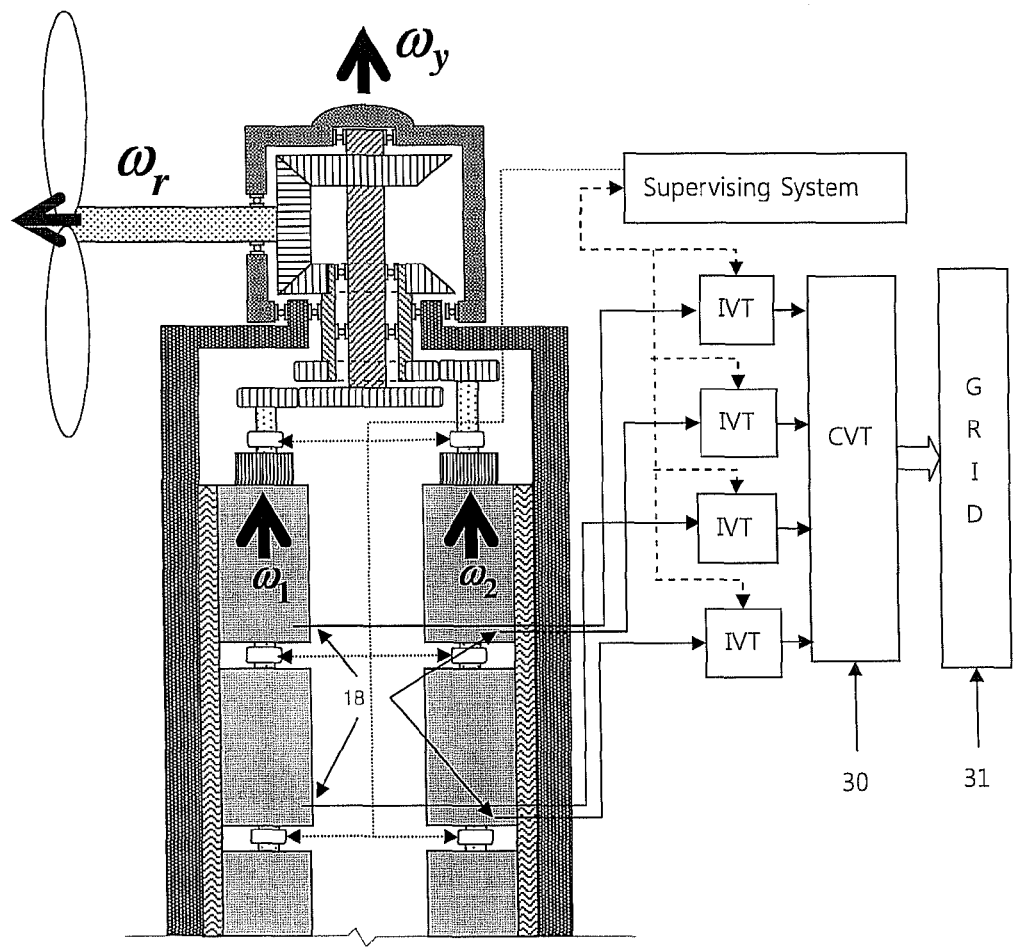
FIG. 12 illustrates an exemplary embodiment of a horizontal axis wind turbine system including a distributed fault tolerant system with a single cvt system and an adaptive clutch control system.

FIG. 12 illustrates an exemplary embodiment of a horizontal axis wind turbine system including a distributed fault tolerant system with a single cvt system and an adaptive clutch control system. Many components of this exemplary embodiment are the same or similar to those of the exemplary embodiment illustrated in FIG. 1. Such components should be understood to have substantially similar characteristics and functionality in both exemplary embodiments. This embodiment may further include a supervising system (28), a single converter (30) and a power grid (31).

In the exemplary embodiment illustrated by FIG. 11 every generator may be directly connected to the power grid (31) using ivt/cvt (29), while a single converter (30) may be employed in the exemplary embodiment illustrated by FIG. 12. Many small sized inverter-converter systems may be cheaper than one huge sized inverter-converter system from mass production point of view. The exemplary embodiments illustrated by FIG. 11 and FIG. 12 may include adaptive clutch control by a supervising system.

Further advantage of multiple generator system may come in view of direct drive system realization. The construction of direct drive generator systems of high capacity may generally require a generator with large girth relative to length. But if a spacious longitudinal space of the tower is utilized, multiple generators with relatively small diameter may be arranged so that they are mechanically interconnected to realize high torque constant generator system cooperatively, which may generate large current at row rotational speed.

An additional benefit of using multiple small sized generators instead of single large one may be the fact that since the amount of heat generated from each generator is much smaller than that from a single large one and they are distributed in space, it is much easier to cool them down and, therefore, it may be possible that natural cooling and proper ventilation may be sufficient. Exemplary embodiments of a horizontal axis wind turbine system may include grouping generators in parallel, series, or both.

Figure 4:
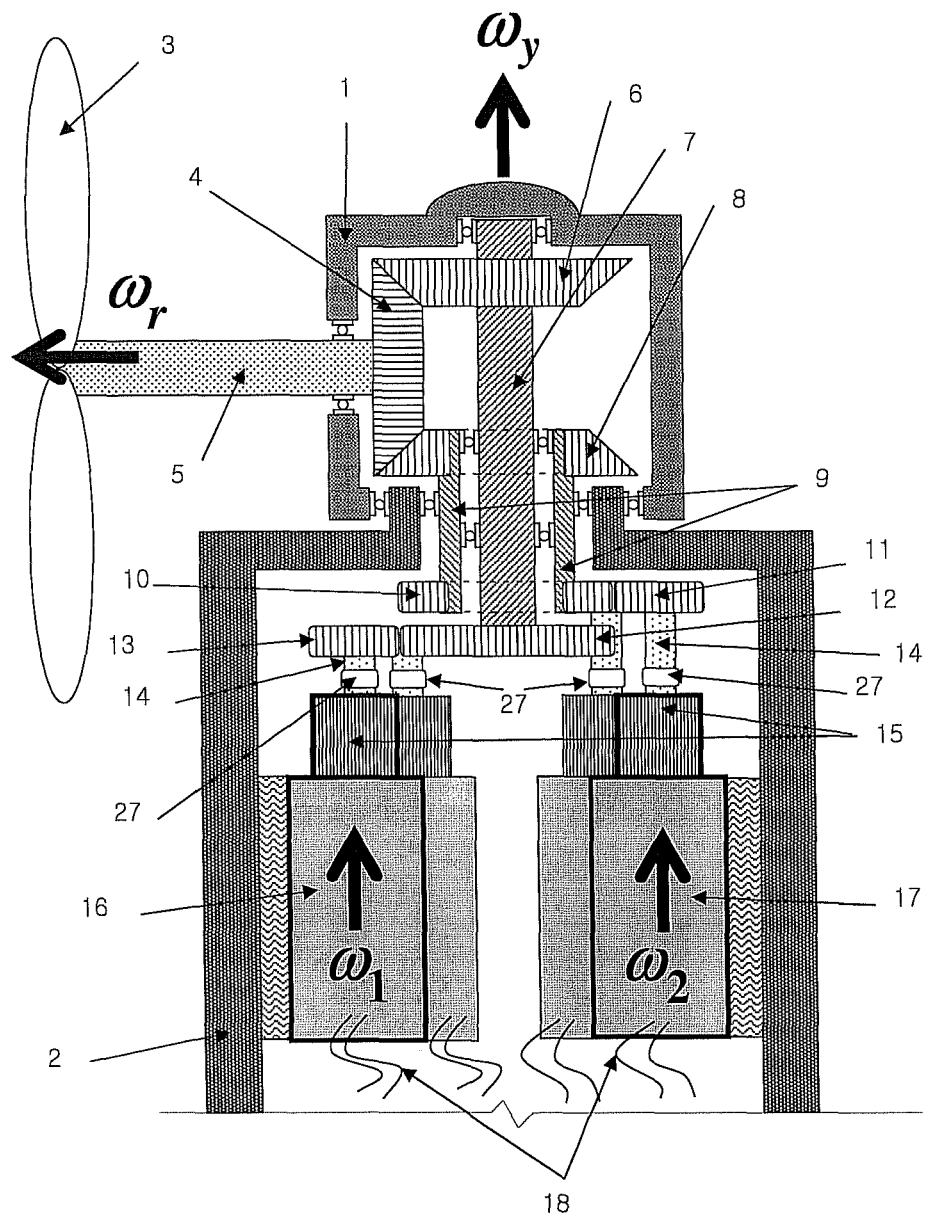
FIG. 4 illustrates an exemplary embodiment of a horizontal axis wind turbine system with multiple generators connected in parallel at each of two vertical coaxial axes.

FIG. 4 shows an exemplary embodiment of a horizontal axis wind turbine system with multiple generators connected in parallel at each of two vertical coaxial axes. Many components of this exemplary embodiment are the same or similar to those of the exemplary embodiment illustrated in FIG. 1, and are identified by similar numerals. Such components should be understood to have substantially similar characteristics and functionality in both exemplary embodiments. Two generators may be connected in parallel to each of gears (10) and (12). In an exemplary method of operating a horizontal axis wind turbine system, multiple generators may be installed at each axis of the two coaxial axes and operated selectively using a clutch (27) according to wind conditions.

Figure 5:
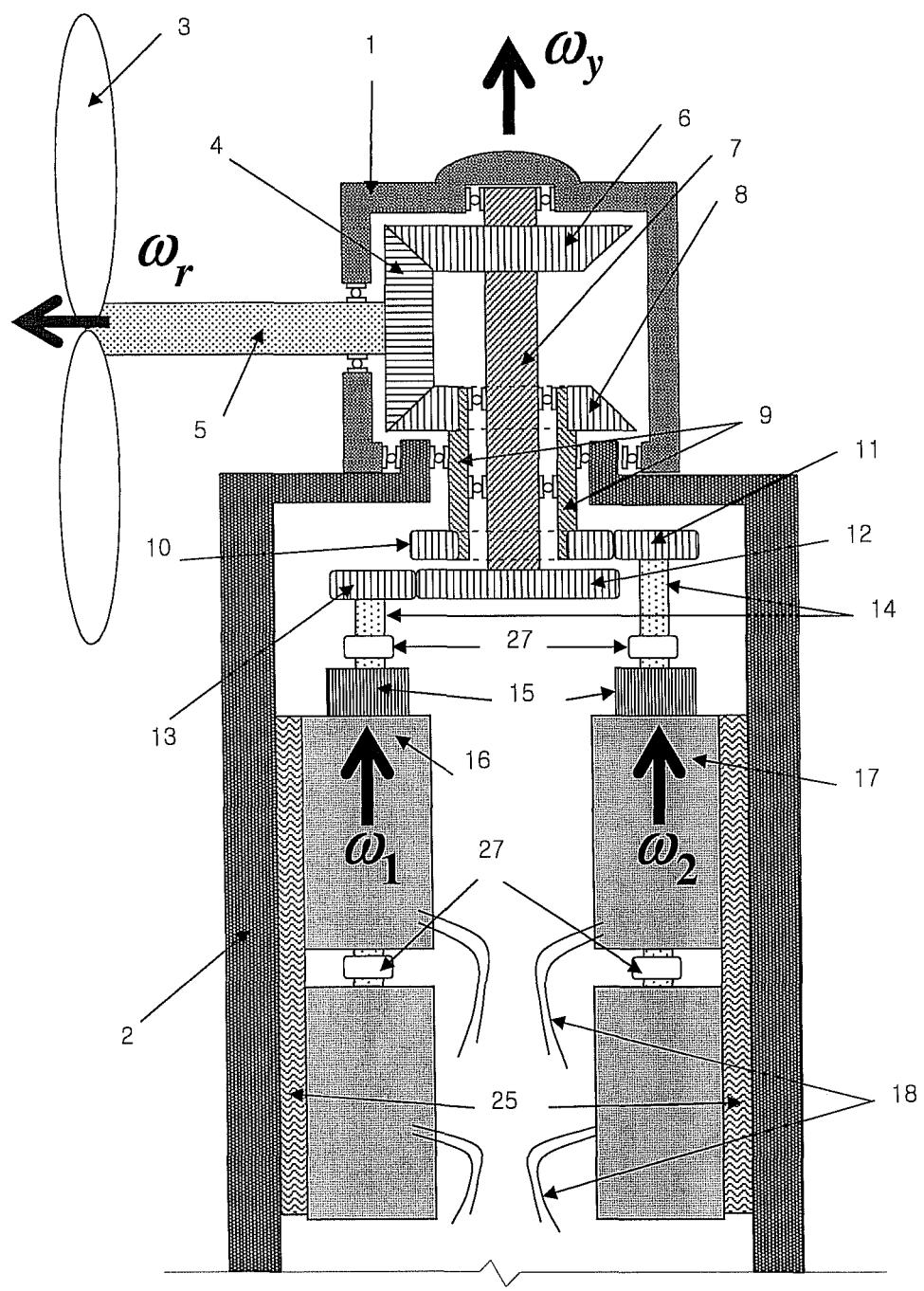
FIG. 5 illustrates an exemplary embodiment of a horizontal axis wind turbine system with multiple generators connected in series at each of two vertical coaxial axes.

FIG. 5 illustrates an exemplary embodiment of a horizontal axis wind turbine system with multiple generators connected in series at each of two vertical coaxial axes. Many components of this exemplary embodiment are the same or similar to those of the exemplary embodiment illustrated in FIG. 1, and are identified by similar numerals. Such components should be understood to have substantially similar characteristics and functionality in both exemplary embodiments. Since generators may be installed vertically along the tower, the space restriction problem may be reduced in comparison to parallel structures, if multiple generators are attached to each of gears (10) and (12). A clutch mechanism (27) may be installed at shafts between two consecutive generators. A hybrid configuration of series and parallel grouping of generators may be also possible.

Figure 6:
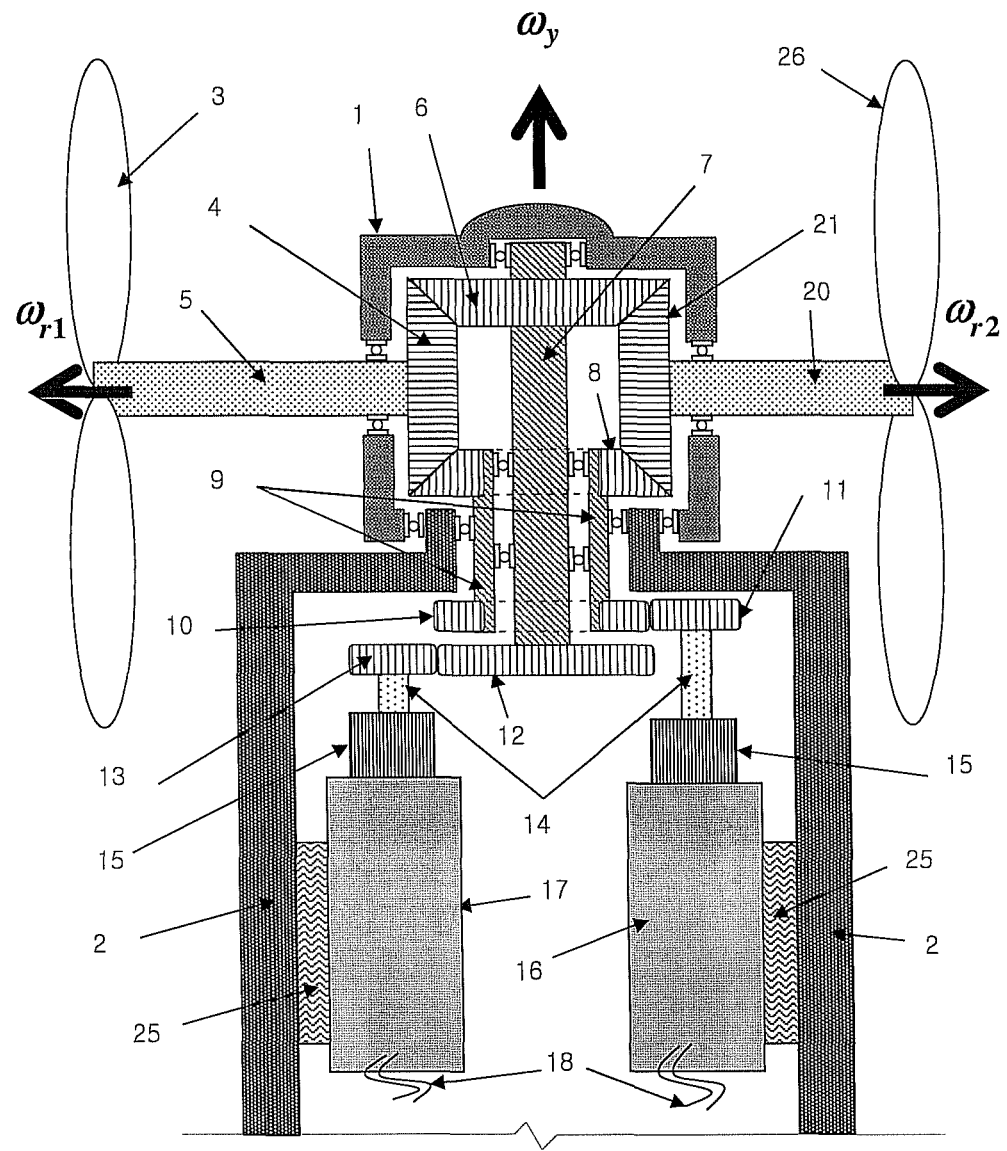
FIG. 6 illustrates an exemplary embodiment of a horizontal axis wind turbine system with two counter rotating rotors with blades.

FIG. 6 shows an exemplary embodiment of a horizontal axis wind turbine system with two counter rotating rotors with blades. Many components of this exemplary embodiment are the same or similar to those of the exemplary embodiment illustrated in FIG. 1, and are identified by similar numerals. Such components should be understood to have substantially similar characteristics and functionality in both exemplary embodiments. This embodiment may further include rotor blades (26) coupled to a rotor shaft (20). The generated power per installation site may be increased by using dualization. Here, blades (3) and (26) may create torques in directions opposite to each other in the same wind condition. In this exemplary dual rotor structure, $\omega_{r1}$ and $\omega_{r2}$ may refer to the rotational speeds of left rotor shaft (5) and the right rotor shaft (20), respectively, and $\tau_{r1}$ and $\tau_{r2}$ may represent corresponding torques at rotor shafts. Among them, the following relationships may hold in relation to the single rotor system already introduced.

$$\omega_r = \omega_{r1} = \omega_{r2} \qquad <15>$$

$$\tau_r = \tau_{r1} = \tau_{r2} \qquad <16>$$

Hence, the basic operation principle explained for a single rotor system may be equally applied to the dual rotor system. For a symmetrical dual rotor structure, there may not be detrimental moments caused either by blades weight biased about yawing axis (i.e., longitudinal center line of tower) or by gyroscopic effects ensued from the rotation of blades and yawing of nacelle, which may otherwise sometimes raise tower design issues for a single rotor HAWT system.

Another exemplary method of operating a horizontal axis wind turbine system may include active furling control. An active furling control method may be conceived especially for small or medium sized HAWT systems. When the wind speed exceeds the cut out speed of the system, the nacelle may be controlled to yaw to face away from the wind direction through a proper angle in an effort to controllably reduce the wind energy input to the blades. Active furling control may be realized using active yawing control previously mentioned. To furl actively and controllably, it may be desirable simply to create a proper amount of unbalance between the two induced generating torques at the two generators, or between the induced generating torques aggregated within each group of two groups of generators. During this active furling operation mode, one generator may generate more power than the other, or one group of generators may generate more power than the other group. In other exemplary embodiments wherein two rotor blades are installed aerodynamically symmetrically as in the system shown in FIG. 8, described below, the amount of torque unbalance in magnitude required to furl controllably may be small in principle.

Figure 7:
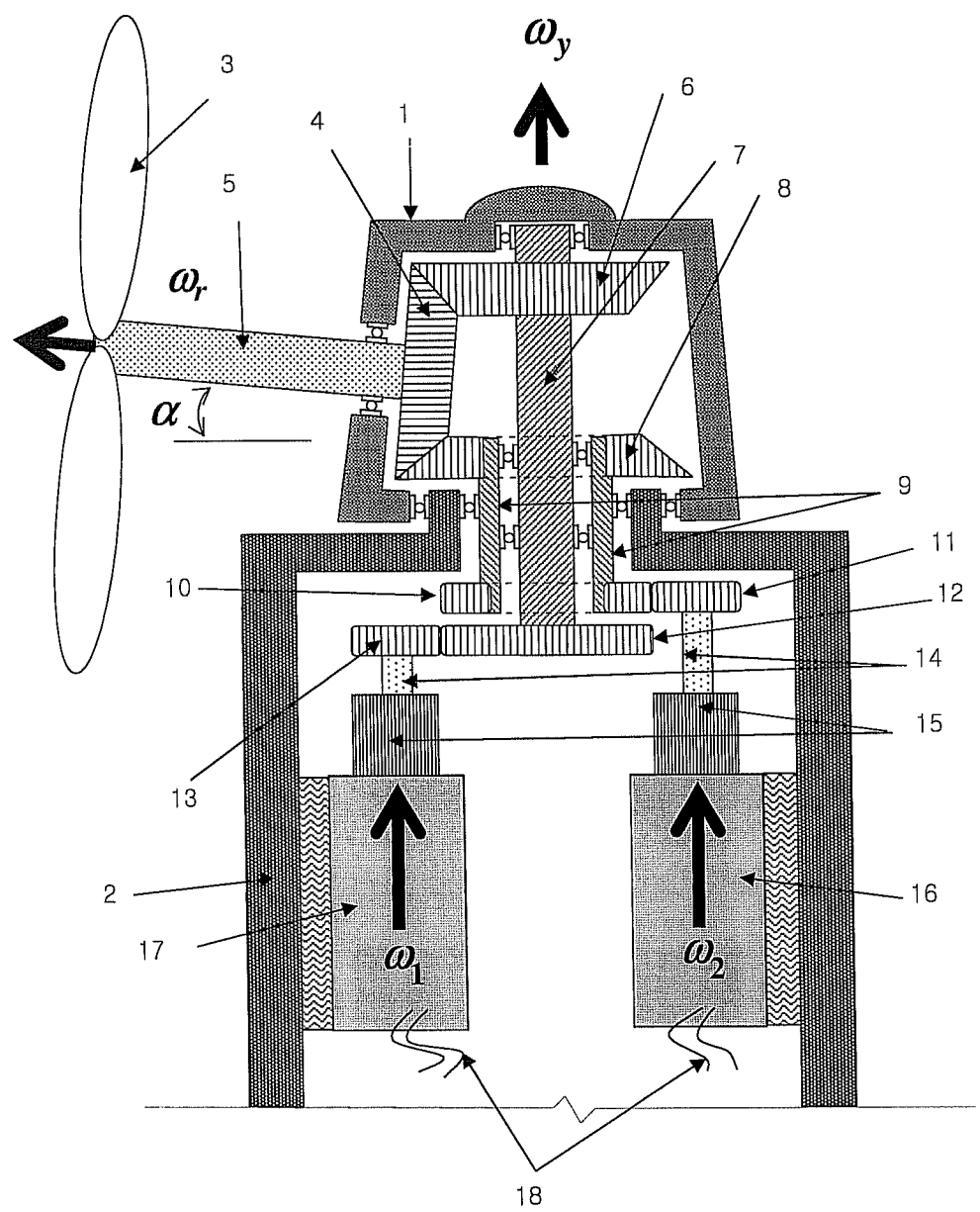
FIG. 7 illustrates an exemplary embodiment of a horizontal axis wind turbine system with a tilted rotor axis.

FIG. 7 shows an exemplary embodiment of a horizontal axis wind turbine system with a tilted rotor axis. Many components of this exemplary embodiment are the same or similar to those of the exemplary embodiment illustrated in FIG. 1, and are identified by similar numerals. Such components should be understood to have substantially similar characteristics and functionality in both exemplary embodiments. To reduce the effect of the distortion of wind flow pattern due to the tower, a HAWT generator system with a slanted axis may be used. The rotor axis may be sloped slightly at angle α from the horizontal. In this case, the kinematic relationships between rotor speed $\omega_r$, yawing speed $\omega_y$, the speeds of two generators $\omega_1$ and $\omega_2$ may be written as $$\omega_1 = a \cdot \omega_r - b \cdot \omega_y$$

$$\omega_2 = -(c \cdot \omega_r + b \cdot \omega_y) \qquad <17>$$

where a, b, and c are positive constants determined by the gear ratio involved in the drive train. Similar relationships among corresponding torques are given by $$\tau_r = a \cdot c \cdot \tau_2$$

$$\tau_y = -(b \tau_1 + b \tau_2) \qquad <18>$$

In this structure, the vertical component of the rotor torque $\tau_r$ may cause unnecessary yawing torque to the nacelle. In order to balance out this parasitic yawing torque, the following relationship may be satisfied between rotor torque $\tau_r$ and nacelle yawing torque $\tau_y$, $$\tau_y = -\tau_r \sin\alpha \qquad <19>$$

Substituting Equation <19> into Equation <18> produces the following relationship between the two torques applied to two generators, $$\tau_1 = \frac{c\sin\alpha + b}{a\sin\alpha - b}\tau_2 \qquad <20>$$

This relationship may be maintained by controlling generating torques induced at two generators in order not to cause unwanted yawing away from the wind direction so that the nacelle may freely yaw following the wind direction using passive yawing mechanism such as a tail vane. On the other hand, any active yawing control may be activated by deliberately perturbing the balance relationship given in Equation <20> between induced generating torques at the two generators. When α is zero, Equation <20> may be reduced to Equation <8>.

Figure 8:
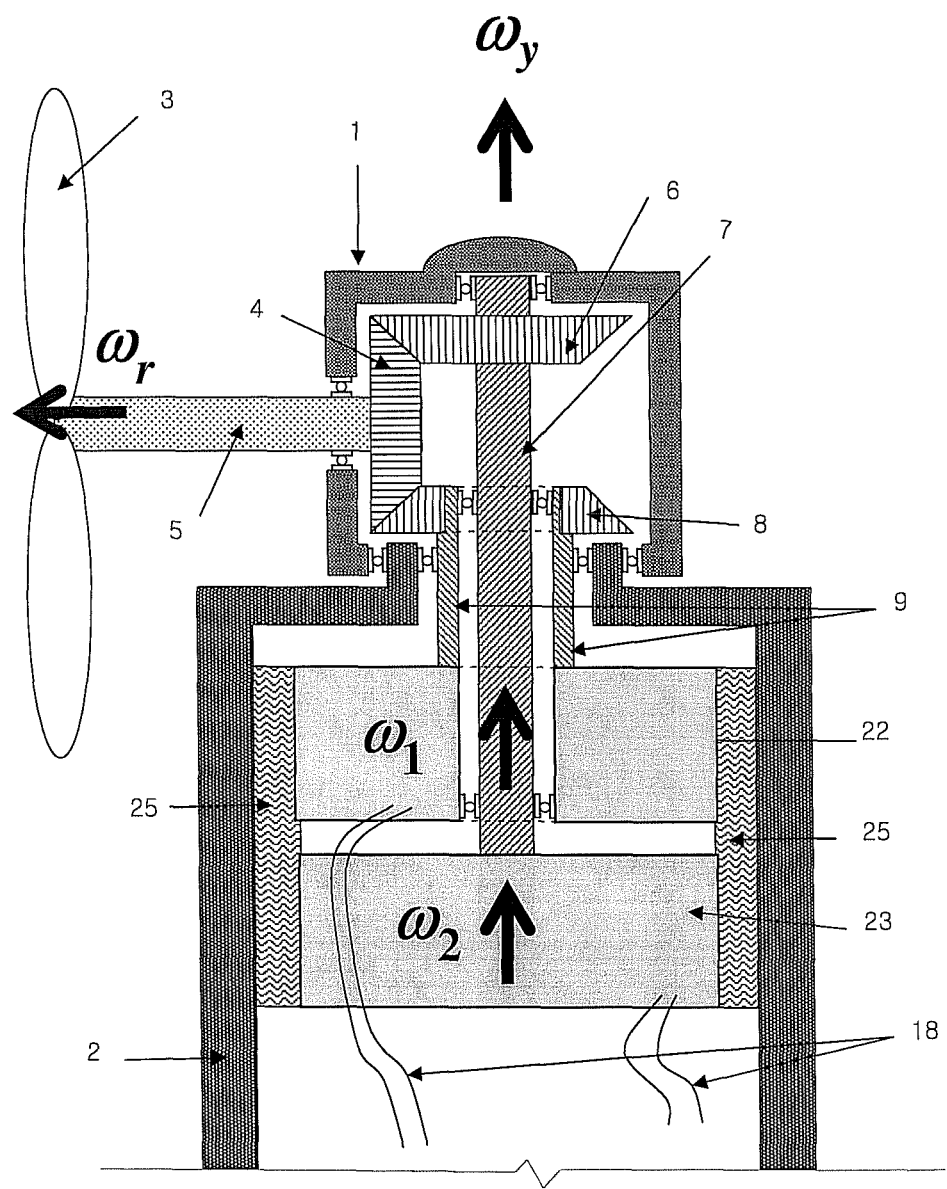
FIG. 8 illustrates an exemplary embodiment of a horizontal axis wind turbine system with coaxially aligned generators.
Figure 9:
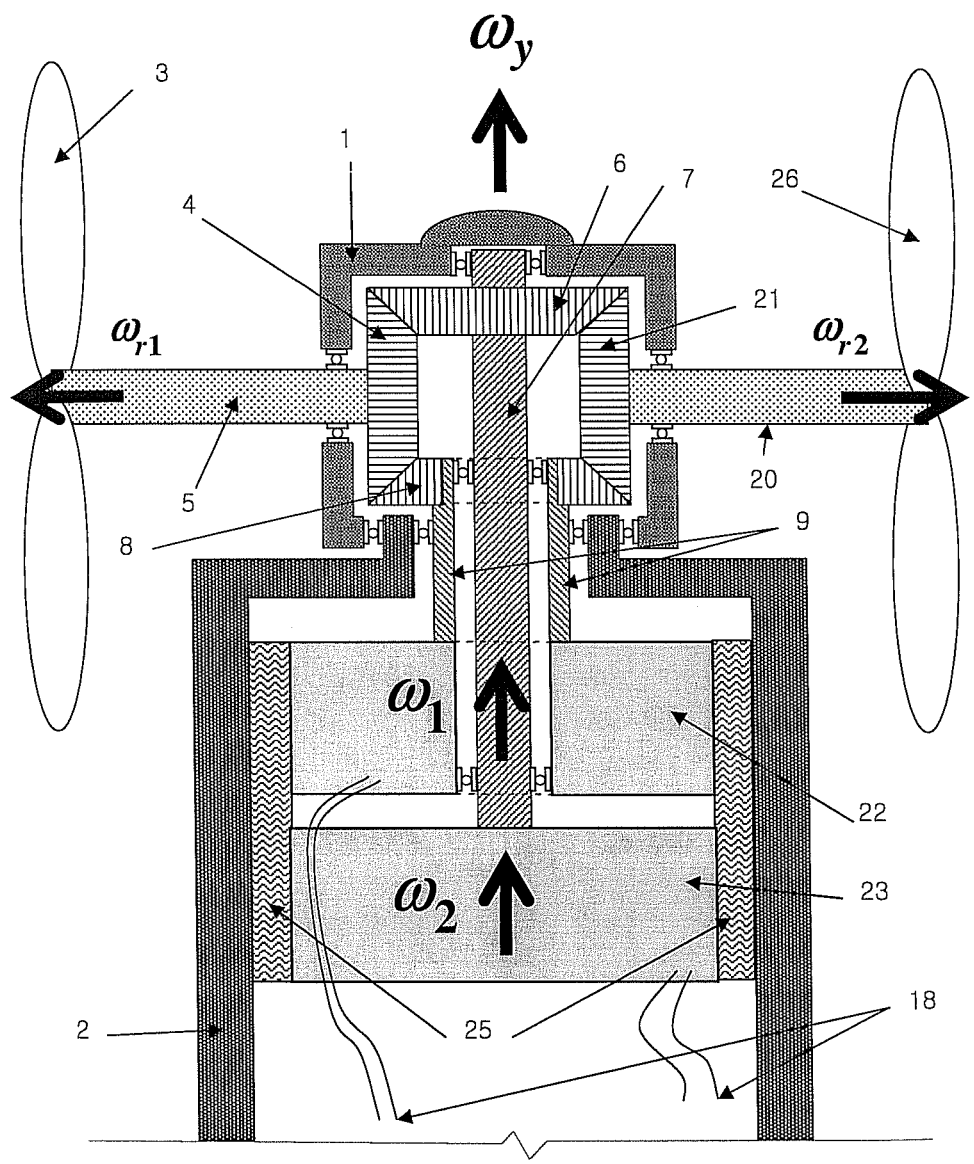
FIG. 9 illustrates an exemplary embodiment of a horizontal axis wind turbine system with coaxially aligned generators with two turbine rotors.
Figure 10:
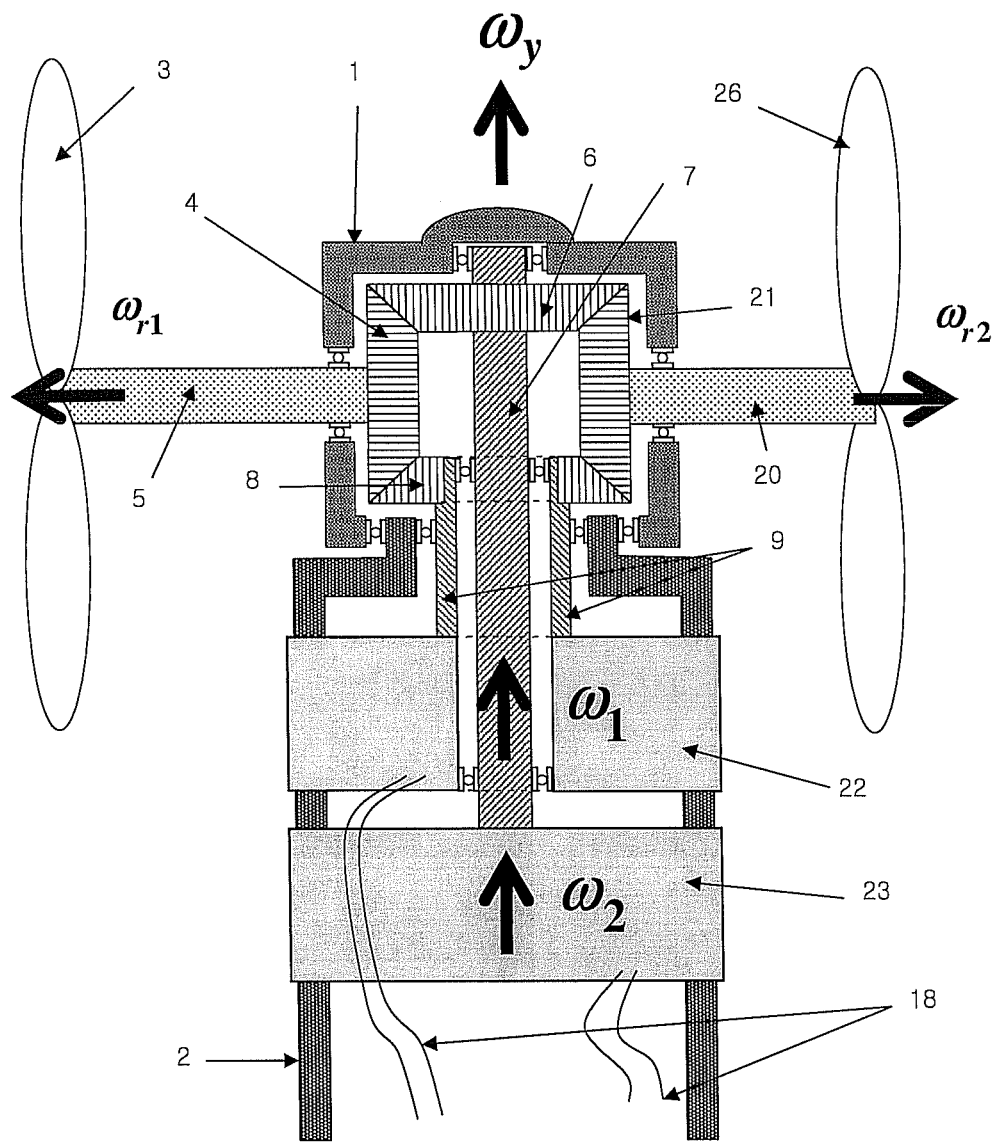
FIG. 10 illustrates an exemplary embodiment of a horizontal axis wind turbine system in which generators are part of a tower.

Referring generally to exemplary embodiments shown in FIGS. 8, 9 and 10, other exemplary embodiments of a horizontal axis wind turbine system may include a structure with coaxially arranged generators.

FIG. 8 shows an exemplary embodiment of a horizontal axis wind turbine with coaxially aligned generators. This system may be operated using direct drive, namely without gears. Many components of this exemplary embodiment are the same or similar to those of the exemplary embodiment illustrated in FIG. 1, and are identified by similar numerals. Such components should be understood to have substantially similar characteristics and functionality in both exemplary embodiments. This embodiment may further include generators (22) and (23), whose axes may be coaxial. The axis of a generator (23) at the bottom may extend through the generator (22) on the top. Here, the hollow shaft (9) may connect the horizontal bevel gear (8) and the generator (22), while the coaxial shaft (9) attached to bevel gear (6) may be further extended through the generator (22) at the top to be connected to the generator (23) at the bottom. This structure may be beneficial especially when the two generators are directly driven without speed-changing gear boxes.

FIG. 9 shows another exemplary embodiment of a horizontal axis wind turbine system with coaxially aligned generators and two turbine rotors. Many components of this exemplary embodiment are the same or similar to those of the exemplary embodiment illustrated in FIG. 8, and are identified by similar numerals. Such components should be understood to have substantially similar characteristics and functionality in both exemplary embodiments. This embodiment may further include rotor shaft (20) and blades (26).

FIG. 10 illustrates an exemplary embodiment of a horizontal axis wind turbine system in which generators are part of a tower. Many components of this exemplary embodiment are the same or similar to those of the exemplary embodiment illustrated in FIG. 9, and are identified by similar numerals. Such components should be understood to have substantially similar characteristics and functionality in both exemplary embodiments. Making generators a part of the tower may provide flexibility in designing the tower. Alternatively, the generators may be exposed to air flow. This may expedite passive cooling of the generators.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments may be made by those skilled in the art without departing from the scope of the invention as defined by the following claims.

What is claimed is:

1. A horizontal axis wind turbine system, comprising:
   at least one turbine rotor adapted to rotate about a horizontal axis;
   at least one rotor blade coupled to the at least one turbine rotor;
   two vertical shafts, arranged coaxially such that one shaft runs through the other;
   a plurality of gears adapted to translate a rotational motion of the at least one turbine rotor into counter-rotating vertical rotational motions of the two vertical shafts arranged coaxially, and
   at least two generators directly fixed to at least one of a tower and the ground, each adapted to translate a vertical rotational motion of one of the at least two vertical shafts into electrical power, and
   wherein the at least two generators are driven independently and respectively by the counter-rotating vertical rotational motions of the two vertical shafts.

2. The horizontal axis wind turbine system of claim 1,
   wherein the at least one turbine rotor comprises at least a first turbine rotor and a second turbine rotor, and
   wherein the second turbine rotor is adapted to create a second torque in a direction opposite to a first torque created by the first turbine rotor.

3. The horizontal axis wind turbine system of claim 1,
   wherein the at least two generators comprise at least two groups of generators.

4. The horizontal axis wind turbine system of claim 3, wherein each of the at least two groups of generator comprise a plurality of generators and a clutch mechanism,
   wherein the plurality of generators is mechanically connected using the clutch mechanism, and configured in at least one of parallel and series, and
   wherein the clutch mechanism is adapted to synchronize rotational motions of at least two of the plurality of generators.

5. The horizontal axis wind turbine system of claim 1, further comprising a supervising system, wherein the supervising system is adapted to control a clutch mechanism by at least one of connecting and disconnecting at least one of the at least two generators.

6. The horizontal axis wind turbine system of claim 1, wherein the at least two generators are controlled independently and cooperatively by using a supervising system.

7. The horizontal axis wind turbine system of claim 1, further comprising a tail vane coupled to the nacelle.

8. The horizontal axis wind turbine system of claim 7, further comprising a control system,
wherein at least two torques are induced, each at one of the at least two generators,
wherein the control system is adapted to substantially maintain a balance between the at least two torques, and
wherein the control system is further adapted to accomplish a free yawing motion of the nacelle following a wind direction by using a yawing torque applied externally to the tail vane.

9. The horizontal axis wind turbine system of claim 1, further comprising a control system,
wherein at least two torques are induced, each at one of the at least two generators,
wherein the control system is adapted to substantially disturb a balance between the at least two torques, and
wherein the control system is further adapted to accomplish an active yawing motion of the nacelle internally.

10. The horizontal axis wind turbine system of claim 1, further comprising a control system,
wherein at least two torques are induced, each at one of the at least two generators,
wherein the control system is adapted to substantially disturb a balance between the at least two torques, and
wherein the control system is further adapted to accomplish active furling to reduce a wind enemy input to the at least one turbine blade.

11. A method of operating a horizontal axis wind turbine system, comprising:
obtaining at least one turbine rotor adapted to rotate about a horizontal axis;
obtaining one rotor blade coupled to the at least one turbine rotor;
obtaining two vertical shafts, arranged coaxially such that one shaft runs through the other;
obtaining a plurality of gears;
obtaining at least two generators directly fixed to at least one of a tower and the ground;
translating a rotational motion of the at least one turbine rotor into counter-rotating vertical rotational motions of the at least two vertical shafts, using the gears,
translating a vertical rotational motion of one of the at least two vertical shafts into electrical power using the at least two generators, and
driving the at least two generators independently and respectively using the counter-rotating vertical rotational motions of the two vertical shafts.

12. The method of operating a horizontal axis wind turbine system of claim 11,
wherein the at least one turbine rotor comprises at least a first turbine rotor and a second turbine rotor, and
wherein the second turbine rotor is adapted to create a second torque in a direction opposite to a first torque created by the first turbine rotor.

13. The method of operating a horizontal axis wind turbine system of claim 11, wherein the at least two generators comprise at least two groups of generators.

14. The method of operating a horizontal axis wind turbine system of claim 13,
wherein each of the at least two groups of generator comprise a plurality of generators and a clutch mechanism,
wherein the plurality of generators is mechanically connected using the clutch mechanism, and configured in at least one of parallel and series, and
wherein the clutch mechanism is adapted to synchronize rotational motions of at least two of the plurality of generators.

15. The method of operating a horizontal axis wind turbine system of claim 11, further comprising:
obtaining a supervising system; and
controlling a clutch mechanism by at least one of connecting and disconnecting at least one of the at least two generators using the supervising system.

16. The method of operating a horizontal axis wind turbine system of claim 15, further comprising:
substantially maximizing a power output using the supervising system by selectively disconnecting at least one of the at least two generators; and
reconnecting at least one of the at least two generators if the horizontal axis wind turbine system cuts in, according to a wind condition.

17. The method of operating a horizontal axis wind turbine system of claim 11, further comprising controlling the at least two generators independently and cooperatively by using a supervising system.

18. The method of operating a horizontal axis wind turbine system of claim 11, further comprising obtaining a tail vane coupled to the nacelle.

19. The method of operating a horizontal axis wind turbine system of claim 18, further comprising:
obtaining a control system; and
accomplishing free yawing motion following a wind direction by using the control system to control the at least two generators, by substantially maintaining a balance between at least two torques, and by using a yawing torque applied externally to the tail vane,
wherein the at least two torques are each induced at one of the at least two generators.

20. The method of operating a horizontal axis wind turbine system of claim 11, further comprising:
obtaining a control system; and
accomplishing active yawing motion of nacelle internally by using the control system to control the at least two generators, and by substantially disturbing as balance between at least two torques,
wherein the at least two torques are each induced at one of the at least two generators.

21. The method of operating a horizontal axis wind turbine system of claim 11, further comprising:
obtaining a control system; and
accomplishing active furling control to reduce a wind energy input to the at least one turbine blade, by using the control system to control the at least two generators, and by substantially disturbing a balance between at least two torques,
wherein the at least two torques are each induced at one of the at least two generators.

22. A wind turbine system, comprising:
at least one turbine rotor adapted to rotate about one of a horizontal axis and an axis tilted with respect to a horizontal direction;
at least one rotor blade coupled to the at least one turbine rotor;

the at least one turbine rotor being operatively coupled to at least a first generator and a second generator, such that rotation of the turbine rotor causes the first and second generators to rotate in substantially opposite directions.

23. The wind turbine system of claim 22, wherein the turbine rotor is disposed in a nacelle, and rotation of the first generator or the second generator is configured to apply a yawing force to the nacelle.

24. The wind turbine system of claim 22, wherein rotation of the turbine rotor causes the first and second generators to apply generally opposed yawing forces to the nacelle.

25. The wind turbine system of claim 24, wherein the generally opposed yawing forces substantially cancel one-another.

26. The wind turbine system of claim 22, wherein the first and second generators are arranged to rotate about substantially vertical axes.

* * * * *